Aug. 20, 1935.   J. W. JOHNSON   2,011,972
EGG HANDLING DEVICE
Filed Oct. 15, 1932   2 Sheets-Sheet 1

INVENTOR.
JAMES W. JOHNSON.
BY James M. Abbett
ATTORNEYS.

Aug. 20, 1935.    J. W. JOHNSON    2,011,972
EGG HANDLING DEVICE
Filed Oct. 15, 1932    2 Sheets-Sheet 2

INVENTOR.
JAMES W. JOHNSON.
BY James M. Abbett
ATTORNEYS.

Patented Aug. 20, 1935

2,011,972

UNITED STATES PATENT OFFICE 2,011,972

EGG HANDLING DEVICE

James W. Johnson, Los Angeles, Calif., assignor of one-half to A. H. Massey, Los Angeles, Calif.

Application October 15, 1932, Serial No. 637,896

2 Claims. (Cl. 294—87)

This invention relates to an egg handling device.

In the marketing of eggs it is common practice to grade the eggs as to size, candle them, and in certain instances to process them. It is desirable to carry out this operation rapidly but due to the fragile nature of the product there has been some difficulty in quickly grading the eggs without breaking them and in easily picking them up and placing them in cartons or crates. It is the principal object of the present invention to provide a device by which a relatively large number of eggs may be picked up in one operation or graded and then candled or processed after which they may be simultaneously set in proper packed position within a crate or in a series of egg cartons and in a manner to insure that the eggs will not be broken by handling.

The present invention contemplates the provision of a frame having a handle structure and which frame is fitted with a plurality of egg spacing means, and a plurality of means adapted to be simultaneously operated to engage the eggs in a manner to cause them to be lifted with the egg handling device when it is raised and to release the eggs in predetermined systematically arranged relationship to each other when desired.

The invention is illustrated by way of example in the accompanying drawings in which.

Figure 3:
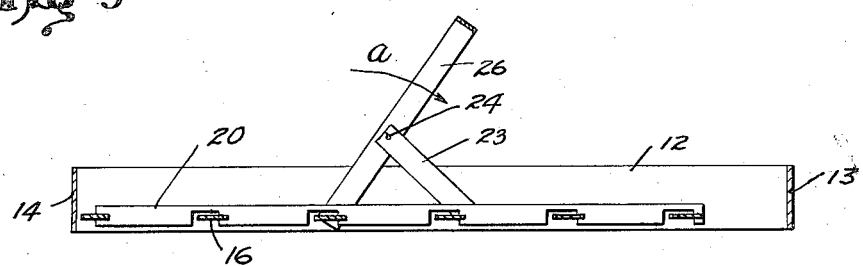
Fig. 3 is a view in vertical section through the egg handling device as seen on the line 3—3 of Fig. 1 and discloses the operating mechanism for the egg lifting bars.
Figure 4:
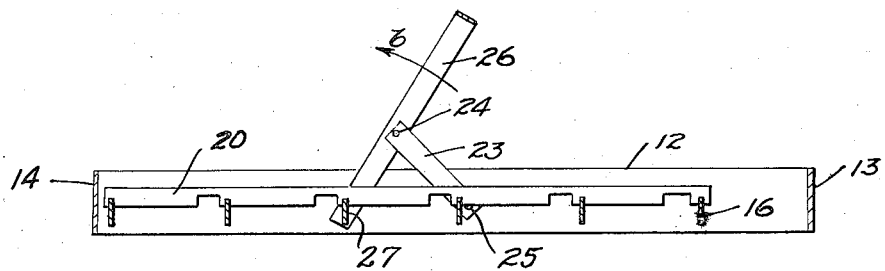
Fig. 4 is a view similar to Fig. 3 showing the egg lifting bars in their vertical position.
Figure 5:
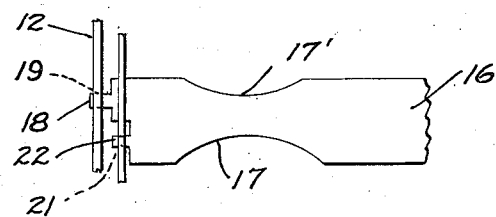
Fig. 5 is an enlarged fragmentary view in plan showing the operating elements of some of the egg lifting bars.

Referring more particularly to the drawings, 10 indicates a frame structure comprising parallel end frames 11 and 12 and parallel side frames 13 and 14. This frame encloses a substantially square field, it being understood that the walls extend vertically and extend along the perimeter of an area sufficient to accommodate a predetermined number of eggs arranged in systematically spaced relation to each other. In the drawings the frame is shown as being of proper dimensions to accommodate three dozen eggs. A bail 15 is secured from one end of the frame member 11 to the opposite end frame member 12 and midway the lengths thereof so that the entire structure may be easily lifted. Extending transversely between the end frame members 13 and 14 are a plurality of egg engaging bars 16. These bars may be formed of straight flexible strips of material of uniform width and thickness throughout or they may be formed at opposite sides with recesses 17 and 17' which are uniformly spaced along opposite sides of the bars and are intended to conform to the sectional contour of an egg which is to be engaged thereby and lifted in the handling device. It has been found in operation of devices of this character that due to the fact that eggs may vary in diameters at the point of engagement by the bars 16 there is the possibility that an egg of unusually large diameter will be caught between the bars 16 as they turn and be crushed. In order to eliminate this effect the bars 16 are preferably made of spring steel so that they may flex laterally and yield to accommodate the egg. The opposite ends of the bars 16 are formed along one edge with pintles 18 which extend longitudinally of the opposite ends of the bar and in longitudinal alignment and extend through openings 19 in the end frame members 11 and 12. These pintles provide a pivotal mounting for each of the bars so that the bars may swing on their longitudinal axes and may be moved to assume positions in parallel relation to each other as shown in Fig. 4 or as lying in a common plane as shown in Fig. 3. The bars may be simultaneously moved by a shifting bar 20 which is shown particularly in Figs. 3 and 4 of the drawings and which is provided with perforations 21 to receive an extension lug 22 projecting from the end of each bar and by which the egg engaging bars 16 may be rotated from their horizontally aligned positions as shown in Fig. 3 to their vertically parallel positions as shown in Fig. 4. The shifting bar 20 is moved longitudinally by a link 23 which is pivoted to the bar at 25 and in turn is secured by a pivot pin 24 to a shifting lever 26. The lever 26 is in the form of a bail which extends transversely of the frame structure 10 and is pivoted thereto upon pins 27 by which it is attached to opposite members of the frame. The bail 26 as will be seen extends at right angles to the handle 15.

Figure 1:
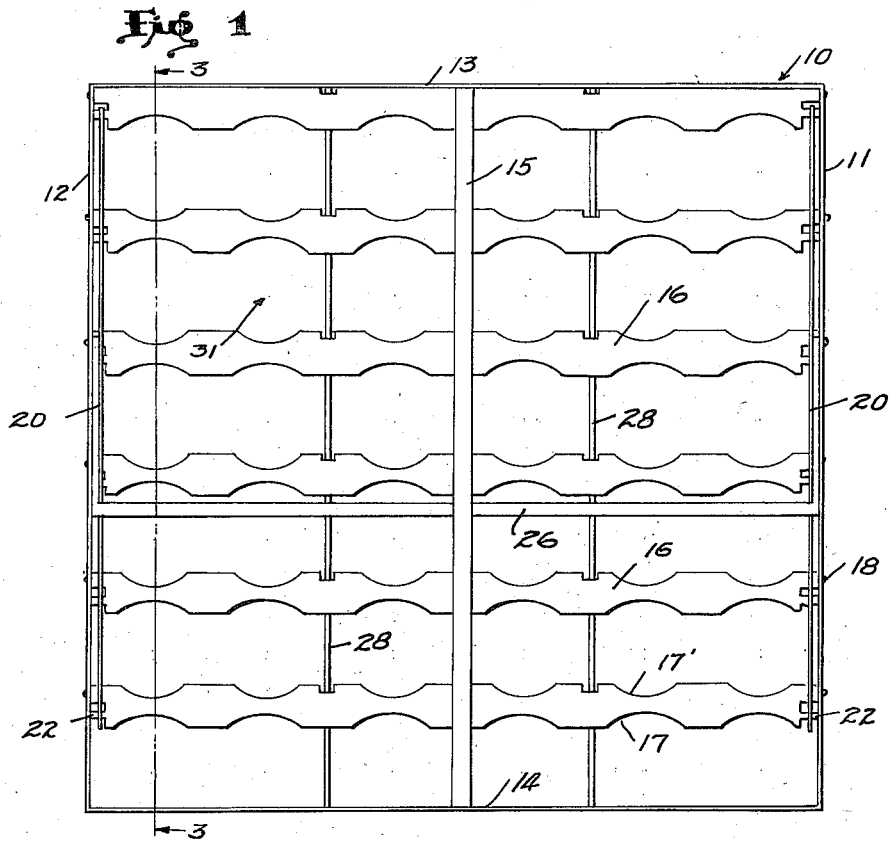
Figure 1 is a view in plan showing the preferred form of my invention.

In order to space the eggs in equal relation to each other longitudinally between the bars 16 supporting bars 28 are provided and secured between the frame members 13 and 14 and at right angles to the longitudinal axes of the lifting bars 16. By reference to Fig. 1 of the drawings it will be further evident that when the lifting bars 16 are in their horizontally aligned positions the arcuate cutaway portions 17 of adjacent bars will in effect define a portion of a circular opening which will limit the downward movement of eggs of predetermined size and will permit eggs of smaller size to pass through the openings so that the device may be used for grading eggs.

In operation of the present invention the structure is assembled as shown in the drawings and when it is to be used as an egg grading device the lifting bars are disposed in a parallel plane as shown in Fig. 3 of the drawings. The frame may be supported above a receptacle and the eggs may be deposited in each of the openings 31 formed by adjacent portions 17 and 17' in a vertically endwise position so that the smaller eggs will fall through the openings between the bars and the eggs of a larger size may be caught by the bars and held. When all of the openings 31 are filled with large size eggs the handle 15 may be grasped to lift the egg handling device and the eggs so that the eggs may be candled or processed while thus held. After these operations have taken place the operating handle 26 may be swung in the direction indicated by the arrow "a" in Fig. 3. This will shift the bar 20 to the position shown in Fig. 4 of the drawings and will move the bars from their horizontally aligned positions as indicated particularly by solid lines in Fig. 6 to the dotted line positions indicated in the same figure. When the bars move in this manner they will rotate on their longitudinal axes and permit the eggs to drop from the openings 31 into a receptacle or carton prepared for them.

Figure 2:
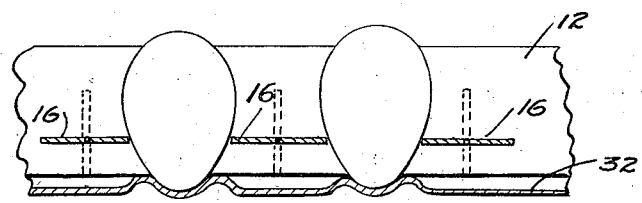
Fig. 2 is a view in vertical section and elevation showing an egg positioned upon an egg filler mat and indicating the lifting bars in their engaged positions in solid lines and their disengaged positions in dotted lines.

In some instances it may be desirable to pick up several dozen eggs at one time and to thereafter deposit them in a crate or in a series of cartons which would each accommodate a proportion of the eggs carried by the device. In order to do this it is desirable for the eggs to be set endwise on paper or cardboard fillers, such as the one indicated at 32 in Fig. 2 of the drawings. In such a position the egg handling device may be placed over and around the eggs while the bars 16 stand in their vertical parallel positions as indicated by dotted lines in Fig. 6 of the drawings, after which the operating handle 26 may be moved in the direction indicated by the arrow "b" in Fig. 4 of the drawings to cause the egg handling bars to swing against the eggs and to engage them along a diameter which is less than the maximum diameter of the eggs. This will insure that the eggs will be supported by the egg lifting bars so that the entire quantity of eggs may be simultaneously lifted in the device and may thereafter be released and deposited upon a desired surface or in a desired receptacle by swinging the lifting bars to their vertical parallel positions. In the event that there is a variation in the size of the eggs it is evident that rigid lifting bars might become wedged between adjacent eggs and cause these eggs to be cracked or crushed. It is for that reason that the spacing bars 28 are flexible so that they will yield, and it is for a similar reason that the lifting bars are made of flexible spring steel so that they will accommodate eggs varying in size and permit the bars to yieldably adjust themselves to the eggs as the bars swing from their vertical parallel positions to their horizontally aligned positions.

It will thus be seen that the egg handling device here disclosed is of simple construction and may be inexpensively manufactured, and that due to its design it may be easily operated and carried from place to place so that eggs may be readily picked up and deposited as desired.

While I have shown the preferred form of my invention as now known to me it will be understood that various changes may be made in the combination, construction and arrangement of parts without departing from the spirit of the invention as claimed.

Having thus described my invention what I claim and desire to secure by Letters Patent is:

1. An egg handling device adapted to set and pick up eggs with relation to a packing case filter tray which comprises a rectangular frame, a bail therefor pivoted to the opposite sides thereof and adapted to swing vertically, a plurality of lifting bars disposed in parallel spaced relation to each other within the frame, each of said bars being formed with longitudinally aligned pivots offset from the longitudinal axis of the bars and pivotally supported in the frame, the ends of said bars being each formed with another pin offset at the opposite side of the longitudinal axis of the bar, said lifting bars being characterized as being made of flat flexible metal and as formed along opposite edges with a plurality of scallops, complementary scallops of adjacent lifting bars being in register to engage the opposite sides of an egg, a pair of shifting bars, one disposed adjacent the opposite ends of the lifting bars and formed with a plurality of openings to receive the second named set of pins formed as part of the lifting bars, and means connected with the bail for moving the shifting bars and to simultaneously produce rotation of the lifting bars around the longitudinal axis of their frame pivots.

2. An egg handling device adapted to set and pick up eggs with relation to a packing case filler tray which comprises a rectangular frame, a bail therefor pivoted to the opposite sides thereof and adapted to swing vertically, a plurality of lifting bars disposed in parallel spaced relation to each other within the frame, each of said bars being formed with longitudinally aligned pivots offset from the longitudinal axis of the bars and pivotally supported in the frame, the ends of said bars being formed with another pin offset at the opposite side of the longitudinal axis of the bar, said bars being characterized as being made of flat flexible metal and as formed along opposite edges with a plurality of scallops, complementary scallops of adjacent lifting bars being in register to engage the opposite sides of an egg, rigid supporting bars extended transversely of the lifting bars and therebeneath, said lifting bars being formed with a series of slots along their lower edge to accommodate the supporting bars and provide support for the lifting bars, a pair of supporting bars, one disposed adjacent to the opposite ends of the lifting bars and formed with a plurality of openings to receive the second named pins formed as part of the lifting bars, and means connected with the bail for moving the lifting bars and to simultaneously produce rotation of the lifting bars around the longitudinal axis of their frame.

JAMES W. JOHNSON.